May 19, 1936.   A. HUET   2,041,643

VOLTAGE REGULATOR

Filed April 11, 1935   2 Sheets-Sheet 1

Inventor:—
Albert Huet,
By:— Smith, Michael and Gardiner,
Attorneys.

May 19, 1936.                A. HUET                2,041,643
VOLTAGE REGULATOR
Filed April 11, 1935       2 Sheets-Sheet 2

Inventor:—
Albert Huet,
By:- Smith, Michael & Gardiner,
Attorneys.

Patented May 19, 1936

2,041,643

UNITED STATES PATENT OFFICE 2,041,643

VOLTAGE REGULATOR

Albert Huet, Jamioulx, Belgium

Application April 11, 1935, Serial No. 15,870
In Belgium April 19, 1934

12 Claims. (Cl. 171—119)

The invention relates to the voltage regulation of electrical distribution systems and in particular of A. C. lines in low-tension systems, such voltage regulators being adapted to maintain the line voltage within given admissible limits of variation.

Means are already known for the automatic regulation of the voltage of electrical distribution systems but they generally require very costly equipment out of proportion to the object in view, in the majority of cases.

The present invention has for its main object to provide an automatic voltage regulator of simple construction and of very low cost.

It consists primarily in constituting the regulator by means of a transformer having its secondary winding connected in series with the line and its primary winding short-circuited when the line voltage is normal or above a given limit, whereas the primary winding is automatically connected to the line if the voltage of this latter falls below the normal or to the limit which has been fixed, the transformer then acting as a booster for the line voltage.

It consists likewise in controlling the changeover of the transformer from its inactive condition with the primary winding short-circuited to active condition as a booster for the line-voltage, by electromagnetic means sensitive to variations of the line-voltage and so arranged as to operate always at approximately the same value of the line voltage.

It consists further in arranging the transformer in such a way that the change-over from its inactive condition with the primary winding short-circuited to active condition as a booster, is effected without any marked drop of voltage in the line.

It consists still further in providing means suitable for improving the precision of operation of the controlling means, and in order to explain clearly how these characteristic features can be attained in practice, there will be described hereafter in greater detail certain preferred embodiments of a voltage regulator according to the invention, reference being made to the accompanying drawings, in which.

Figs. 3, 4, 5, and 7 to 10 inclusive represent various accessory devices intended to improve the operation of the regulator controlling means.

Figure 6:
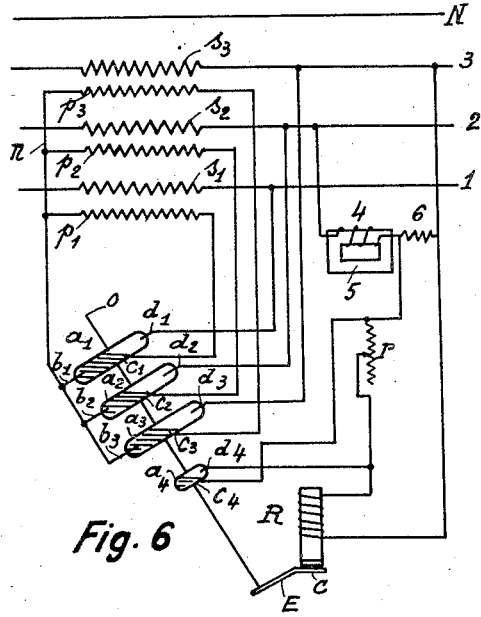

Fig. 6 is a diagram, partly in perspective, of the voltage regulator associated with a three-phase distribution system and combined with one of the accessory devices for the purpose of improving the operation of the regulator controlling means.

Figure 1:
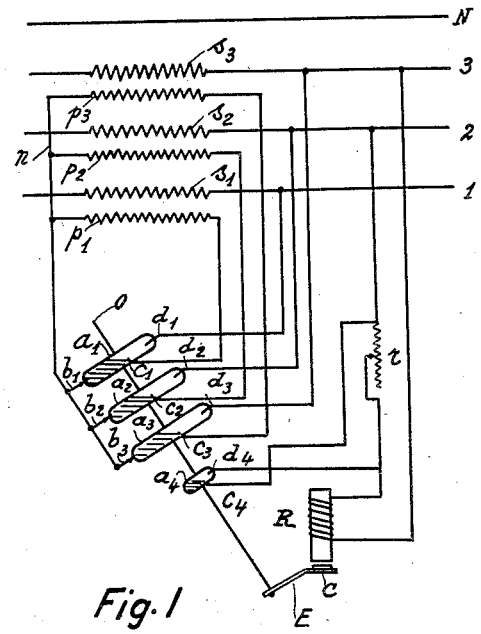
Fig. 1 is a diagram, partly in perspective, of the voltage regulator associated with a three-phase A. C. electrical distribution system.
Figure 3:
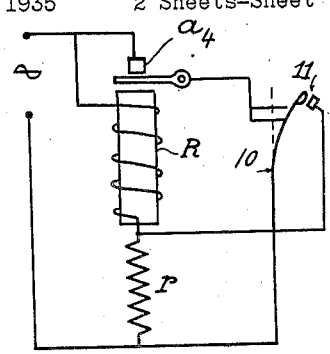
Figure 2:
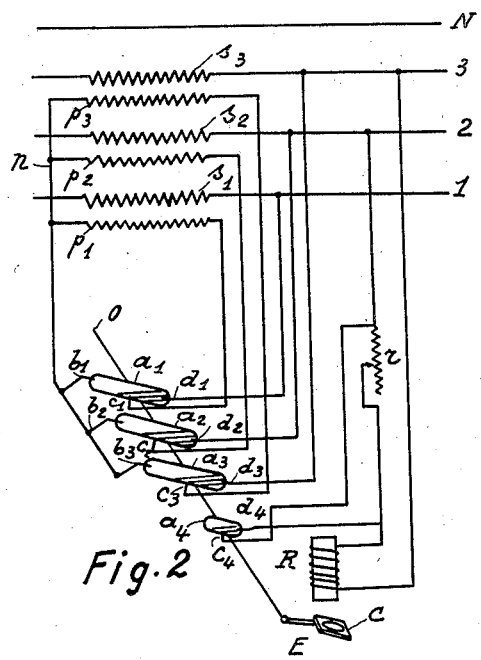
Fig. 2 is a corresponding view, with the regulator in action as a booster for the line-voltage.

Referring to Figs. 1, 2, and 6, the numerals 1, 2, and 3 designate the three phase-lines of the distribution line and N the neutral conductor.

In the phase-lines 1, 2, and 3, there are connected in series three windings respectively designated $s_1$ $s_2$ $s_3$, constituting the secondaries of a transformer of which the corresponding primary windings are designated $p_1$ $p_2$ $p_3$.

These primary windings $p_1$ $p_2$ $p_3$ are connected at one end to a star or neutral point $n$, connected in its turn to one terminal connection $b_1$ $b_2$ $b_3$ of each of three contact devices, illustrated in the example selected as mercury switches $a_1$ $a_2$ $a_3$. Each of these switches comprises an intermediate connection designated as $C_1$ $C_2$ $C_3$ and connected to the other extremity of the corresponding primary winding, as represented in the drawings. The other extreme terminal connections designated $d_1$ $d_2$ $d_3$ of the switches $a_1$ $a_2$ $a_3$ are respectively connected to the phase lines 1, 2 and 3 of the distribution systems.

The three mercury switches $a_1$ $a_2$ $a_3$ are mounted upon a common pivoted support represented diagrammatically and designated O, of which the rocking movement is controlled by a relay or electromagnet R, normally excited by a connection between two phase-lines, for example the phases 3 and 2, or again between one of the phase-lines and the neutral conductor N of the system. The armature C of the relay or electromagnet R is connected by a suitable link or lever E to the rocking support O, the arrangement being such that when the relay R releases its armature C, the three switches $a_1$ $a_2$ $a_3$ are rocked into the position represented in Fig. 2. The relay R is arranged to operate and attract its armature C when the voltage of the system is at its normal value, and to release it if the voltage falls below a given value; when the voltage is normal or greater than this limit, the switches occupy the position represented in Fig. 1, in which the primary windings $p_1$ $p_2$ $p_3$ are short-circuited. In these conditions, the only action of the transformer is that of a very low inductance in series with the line, which cannot cause more than a very slight drop of voltage.

If the voltage of the system falls below the fixed limit, the relay R releases its armature C; the switches $a_1$ $a_2$ $a_3$ then rock into the position of Fig. 2, in which the windings $p_1$ $p_2$ $p_3$ are connected in circuit so as to affect the secondary windings $s_1$ $s_2$ $s_3$ by inducing therein a voltage which is added to the line voltage. The regulator thus acts in the manner of a booster and the voltage beyond the transformer will therefore be greater than the voltage ahead of the transformer.

During the moment of change-over from the short-circuited position of the primary windings (Fig. 1) to the position in which these windings are excited (Fig. 2), the primaries of the transformer are open-circuited and the secondaries are still traversed by the currents of the different phase-lines. These line-currents act at this moment as magnetizing currents and this might produce a considerable drop of voltage beyond the regulator while an induced voltage would appear at the breaking of the primary circuits.

In order to obviate this disadvantage, the transformer is arranged according to the invention with iron cores working in the vicinity of their limit of saturation in such a way that the magnetizing or no-load current represents a considerable fraction of the load-current, the drop of voltage during the change-over from one position to the other and the induced voltage at the break being thus avoided.

On the other hand, if the control of the transformer is effected by means of an ordinary relay or electromagnet R, when such relay or magnet winding is connected directly to the line or bus-bars, it will release its armature C at a value of the voltage considerably lower than that at which the armature moves when attracted. In order to obviate this disadvantage, there is mounted in series with the relay or electromagnet R a variable resistor $r$, this resistor being placed on short circuit during the booster action of the transformer. For this purpose, recourse may be had to various means, and in the example selected there has been provided for this purpose a mercury switch $a_4$ mounted upon the rocking support O, fitted with a central contact $c_4$ and one extreme terminal contact $d_4$ and connected in shunt across the resistor $r$, the arrangement being such that when the relay R releases its armature the circuit is established between the contacts $c_4$ and $d_4$ thus short-circuiting the resistor $r$ as represented in Fig. 2. A suitable adjustment of the variable resistor $r$ will allow then of obtaining the operation and the release of the relay or electromagnet R for approximately the same value of the voltage in the circuit.

It may be advantageous, in order to avoid uncertainty in the operation of the relay, to short-circuit the resistor $r$ only when the armature of the relay R has completed its full movement. It will then suffice, according to the invention, to short-circuit the resistor $r$ by the aid of a retarding device, for example that represented in Fig. 3, in which the switch $a_4$ has its contacts (corresponding to $c_4$ $d_4$ in Fig. 1) closed when the armature of the relay is released; this switch closes the circuit of a thermal relay of any suitable construction (represented for example by a bimetallic strip 10) which after the desired time-lag (in the present case, the time necessary for the heating up of the bimetallic strip) closes at the point 11 a circuit shunting the resistor $r$.

Figure 4:
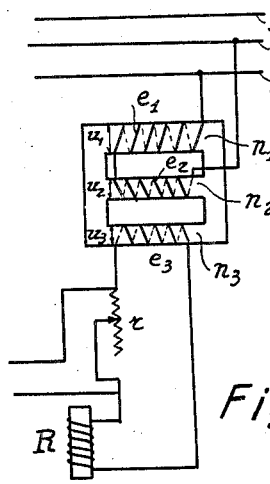

To increase the precision of adjustment of the regulator above described, and in accordance with the invention, recourse might likewise be had to various other accessory devices. For example, as represented in Fig. 4, the circuit of the relay or electromagnet R is completed by an auxiliary transformer comprising a magnetic circuit having three branches, of which the cores $n_1$ $n_2$ $n_3$ have different effective cross sections, designated respectively by $u_1$ $u_2$ $u_3$. Windings $e_1$ $e_2$ $e_3$ are wound respectively upon these cores, the windings $e_1$ $e_2$ being connected in series and to the lines or bus-bars, while the winding $e_3$ supplies current to the circuit of the relay R.

In these conditions, if the numbers of turns in the windings $e_1$ $e_2$ are chosen in suitable relation with the cross sections of the cores, no magnetic flux will traverse the core $n_3$ until the moment when the core $n_2$ is saturated; from this moment onwards, the flux traverses the core $n_3$ and causes the winding $e_3$ to excite the relay or electromagnet R, this taking place as and from a predetermined value of the line-voltage.

The ratio of the numbers of turns in the windings $e_1$ $e_2$ may be exactly inverse to the ratio of the cross sections of the corresponding cores, the flux then appearing in the core $n_3$ at the moment of saturation of the core $n_2$, which is of smaller effective cross section than the core $n_1$; but this condition is not indispensable, and in certain cases it may be preferable that the winding $e_3$ shall be tranversed initially by a flux of small value which is annulled when saturation of the core $n_2$ is produced and thereafter reverses the direction of circulation.

Figure 5:
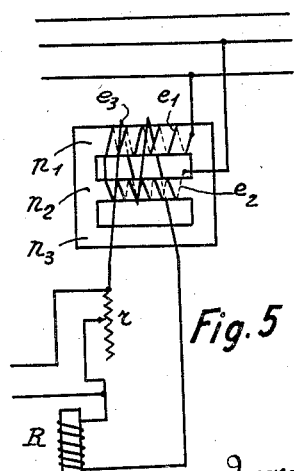

The device of Fig. 5, which corresponds to the same object, is in principle analogous to that of Fig. 4, but it has, as compared with this latter, the advantage of reducing magnetic leakage, the winding $e_3$ being in this case wound around the cores $n_1$ $n_2$.

Another method intended to improve the precision of operation of the relay or electromagnet R, is represented in Fig. 6, where there has been shown mounted in the circuit of the relay R a reactor 4, comprising a magnetic core 5 and associated means, as for example a series resistor 6, for transforming the variations of current in the reactor into variations of voltage. In the example shown, this group is fed by the line-voltage, but it might equally well be fed by a voltage which is proportional thereto.

The value selected for the resistor 6 is low compared with the impedance of the reactor 4, so that the voltage across the reactor will be approximately equal to the applied voltage.

The reactor 4 being designed to operate with a magnetic induction approximating to the saturation of its core 5, the current in the reactor will vary relatively more rapidly than the applied voltage and in passing through the resistor 6, this current generated in the reactor will produce across the resistor a voltage which remains rigorously proportional to the current and thus varies relatively more rapidly than the voltage applied to the reactor.

Since the voltage with relatively very rapid variations available across the resistor 6 is applied to the relay or electromagnet R, the sensitivity of the latter to variations of the line-voltage will be considerably increased.

The resistor 6 might be replaced by a capacity or an unsaturated reactor, the relay R being then connected across such capacity or unsaturated reactor. The voltage which would be applied in this way to the relay or electromagnet R would vary likewise in proportion much more rapidly than the line-voltage.

If it were desired, the winding of the relay or electromagnet R might replace the resistor 6 in the arrangement represented, the said winding thus becoming the seat of currents varying in proportion much more rapidly than the applied voltage, with an increase of the sensitivity of the electromagnet or relay, as in the case previously described.

Figure 7:
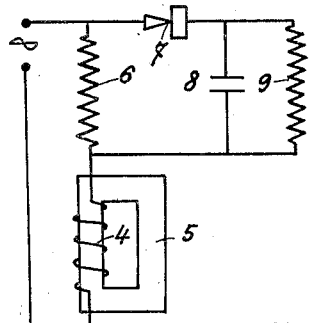

In Fig. 7, the reactor, core and resistor of Fig. 6 are shown again at 4, 5, and 6 respectively, but the alternating voltage which appears across the resistor 6 is rectified by any known rectifying device, indicated diagrammatically at 7, a condenser 8 and a discharge resistor 9 being connected in circuit. This resistor could likewise be constituted by the winding of the relay R.

The reactor being saturated, the current which traverses it has a distorted or pointed wave-form, although the supply voltage may be sinusoidal, and this pointed wave-form is more accentuated in proportion as the saturation of the magnetic core 5 is itself greater.

In these conditions, the condenser 8 becomes charged approximately to the maximum peak voltage, which increases more rapidly than the mean value of the rectified voltage or than the effective value of the alternating voltage before its rectification. It follows that the D. C. voltage obtained across the condenser 8 will vary much more rapidly than the A. C. voltage applied to the group described.

The function of the resistor 9 connected across the condenser 8 is to produce a slow discharge of this condenser in order that the voltage across it may be able to fall to the level of the maximum value of the A. C. voltage which exists across the resistance 6, when this last-mentioned voltage is on the decrease.

The discharge of the condenser 8 allows the armature of the controlling relay R to complete its movement after the short-circuiting of the resistor r and thus obviates uncertain operation of the relay.

Figure 8:
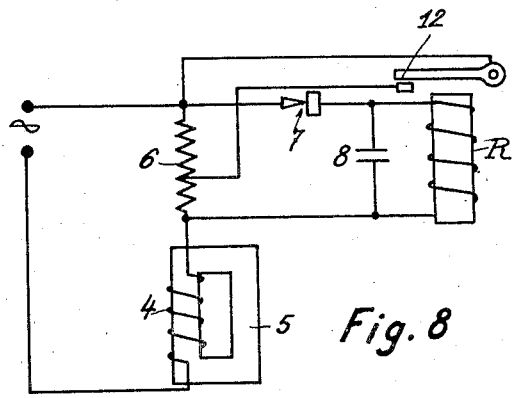

An arrangement of this kind is represented in Fig. 8 in which 4 designates the reactor, 5 its magnetic core, 6 the resistor associated with the reactor, 7 the rectifier and 8 the condenser. The discharge resistor 9 is constituted by the winding of the controlling relay R. Moreover, there is provided a contact switch 12 which is closed at the operation of the relay R and forms part of a circuit comprising a portion of the resistor 6, such that when the switch 12 is closed and therefore the said portion of the resistor is short-circuited, the voltage across the relay R retains a value slightly greater than the limiting voltage for maintenance of its armature. By reason of the slow discharge of the condenser 8, the contact switch 12 can be closed before the armature of the relay R has completed its full movement, the said condenser furnishing the energy necessary to the completion of this movement.

Figure 9:
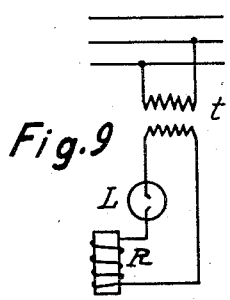
Figure 10:
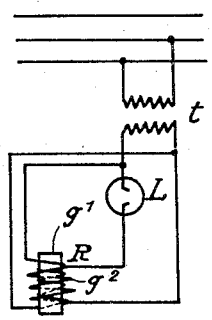

Again, in order to increase the precision of the voltage regulator, there might be utilized the known property of discharge tubes possessing a well-defined and practically constant striking voltage, the arrangement of the circuit of the relay R being carried out according to the diagram of Fig. 9 or Fig. 10.

According to Fig. 9, the relay R is connected directly or (as shown) with interposition of a transformer $t$, between two phases or between the neutral line and one of the phase-lines of the system, and in series with the coil of the relay R there is mounted a discharge tube L, such as a neon lamp.

If, however, the energy were not sufficient for energizing the relay R sufficiently to operate the mercury switches $a_1$ $a_2$ $a_3$ (Figs. 1-2), there might be interposed in the well known manner an intermediate relay or amplifying device of any suitable type, or again the arrangement might be carried out according to Fig. 10.

In this figure, the relay R comprises a first winding $g_1$ connected directly across the secondary winding of the transformer $t$ but having a number of ampere-turns insufficient to cause the relay to attract its armature and slightly less than the number of ampere-turns at which the relay releases its armature, and a second co-operating winding $g_2$ adapted to furnish the supplementary ampere-turns necessary for the operation of the relay. The relay $g_2$ is mounted for example in series with the discharge tube or lamp L and the whole connected to the extremities of the secondary winding of the transformer $t$.

In both cases, the discharge tube or lamp will allow current to pass only at a well-defined value of the voltage, whereby the accuracy of the regulation obtained by the action of the relay R is improved.

Although the invention has been more particularly described in its application to the voltage-regulation of a three-phase system, it is quite evident that it is not limited thereto but is equally applicable to other alternating current systems, such application offering no difficulty to those skilled in the art.

It is likewise obvious that the invention is not limited to the particular examples and arrangements described and represented, but may comprise any modifications and variations within the scope of the appended claims.

What I claim is:—

1. A voltage regulator for A. C. electrical lines, comprising a transformer having primary and secondary windings, said secondary winding being adapted to boost the line voltage, a switch for connecting said primary winding to said line, and means responsive to said line voltage for closing said switch at a given value of said line voltage, said transformer having its magnetic circuit then operating in the vicinity of the saturation limit.

2. A voltage regulator for A. C. electrical lines, comprising a transformer having primary and secondary windings, said secondary winding being adapted to boost the line voltage, a switch for connecting said primary winding to said line, electromagnetic means for opening said switch at a given value of said line voltage, and an auxiliary transformer for connecting said electromagnetic means to said line, said auxiliary transformer having a closed magnetic circuit including cores of different effective cross sections, two windings wound on separate cores of said magnetic circuit being arranged in series and connected to said lines, and a third winding influenced by the resultant flux of said magnetic circuit being connected to said electromagnetic means.

3. A voltage regulator for A. C. electrical lines, comprising a transformer having primary and secondary windings, said secondary winding being adapted to boost the line voltage, a switch for connecting said primary winding to said line, electromagnetic means for opening said switch at a given value of said line voltage, and an auxiliary transformer for connecting said electromagnetic means to said line, said auxiliary transformer having a closed magnetic circuit including three cores of different effective cross sections, two windings wound on two separate cores of said magnetic circuit being arranged in series and connected to said lines and a third winding wound on the other core of said magnetic circuit being connected to said electromagnetic means.

4. A voltage regulator for A. C. electrical lines, comprising a transformer having primary and secondary windings, said secondary winding being adapted to boost the line voltage, a switch for connecting said primary winding to said line, electromagnetic means for opening said switch at a given value of said line voltage, and an auxiliary transformer for connecting said electromagnetic means to said line, said auxiliary transformer having a closed magnetic circuit including cores of different effective cross sections, two windings wound on separate cores of said magnetic circuit being arranged in series and connected to said lines, and a third winding wound around the pair of cores carrying said two windings, said third winding being connected to said electromagnetic means.

5. A voltage regulator for A. C. electrical lines, comprising a transformer having primary and secondary windings, said secondary winding being adapted to boost the line voltage, a switch for connecting said primary winding to said line, electromagnetic means excited by said line-voltage for opening said switch at a given value of said line voltage, a reactor included in the exciting circuit of said electromagnetic means, said reactor having a magnetic core and operating at an inductance approximating to the saturation of said core, and means for converting the rapid variations of current furnished by said reactor into rapid variations of voltage.

6. A voltage regulator for A. C. electrical lines, comprising a transformer having primary and secondary windings, said secondary winding being adapted to boost the line voltage, a switch for connecting said primary winding to said line, electromagnetic means excited by said line voltage for opening said switch at a given value of said line voltage, a reactor included in the exciting circuit of said electromagnetic means, said reactor having a magnetic core and operating at an inductance approximating to the saturation of said core, an impedance shunt to said electromagnetic means, means for rectifying the voltage across said impedance shunt, a condenser fed by the voltage of said rectifying means, and a discharge resistance for said condenser.

7. A voltage regulator for A. C. electrical lines, comprising a transformer having primary and secondary windings, said secondary winding being adapted to boost the line voltage, a switch for connecting said primary winding to said line, electromagnetic means excited by said line voltage for opening said switch at a given value of said line voltage, a reactor included in the exciting circuit of said electromagnetic means, said reactor having a magnetic core and operating at an inductance approximating to the saturation of said core, an impedance shunt to said electromagnetic means, means for rectifying the voltage across said impedance shunt, and a condenser fed by the voltage of said rectifying means, the discharge of said condenser exciting said electromagnetic means.

8. A voltage regulator for A. C. electrical lines, comprising a transformer having primary and secondary windings, said secondary winding being connected in series with the line, a switch for connecting said primary winding to said line, electromagnetic means controlled by the voltage of said line for opening said switch at a given value of said line voltage, a reactor associated with said electromagnetic means, said reactor having a magnetic core, a resistor in series with said reactor, a rectifier and a condenser forming a shunt across said resistor, and means for short-circuiting a portion of said resistor upon the operation of said electromagnetic means to close said switch.

9. A voltage regulator for A. C. electrical lines, comprising a transformer having primary and secondary windings, said secondary winding being connected in series with the line, a switch for connecting said primary winding to said line, electromagnetic means controlled by the voltage of said line for opening said switch at a given value of said line voltage, a reactor associated with said electromagnetic means, said reactor having a magnetic core, a resistor in series with said reactor, a rectifier and a condenser forming a shunt across said resistor, an auxiliary contact device opened simultaneously with the switch-opening operation of said electromagnetic means, and electrical connections from said auxiliary contact device to the extremities of a portion of said resistor, the arrangement being such that upon the switch-opening operation of said electromagnetic means the rectified voltage fed to said electromagnetic means remains sufficient to maintain it in operated condition.

10. A voltage regulator for A. C. electrical lines, comprising a transformer having primary and secondary windings, said secondary winding being connected in series with the line, a switch for connecting said primary winding to said line, electromagnetic means for opening said switch, a discharge tube, and means for feeding said electromagnetic means through said discharge tube, said feeding means supplied by the line voltage.

11. A voltage regulator for A. C. electrical lines, comprising a transformer having primary and secondary windings, said secondary winding being connected in series with the line, a switch for connecting said primary winding to said line, electromagnetic means for opening said switch, said switch opening means including two co-operating coils, one of said co-operating coils being energized from said lines but providing insufficient ampere-turns to produce operation of said switch-opening means, the other of said co-operating coils providing additional ampere-turns to produce operation of said switch-opening means, and a discharge tube included in the circuit of said other co-operating means.

12. A voltage regulator for polyphase A. C. electrical lines, comprising a transformer having primary and secondary windings, said secondary windings being connected in series with the respective phase lines, switching means normally short-circuiting said primary windings but adapted to connect said primary windings to the respective phase lines, said switching means including a rocking support and a plurality of mercury switches mounted thereon, each of said mercury switches including two terminal connections and an intermediate connection, one of said terminal connections and said intermediate connection connected to a primary winding of said transformer, the other of said terminal connections connected to one phase line, another mercury switch mounted on said rocking support, electromagnetic means excited by the line voltage for rocking said support, and a resistor included in the exciting circuit of said electromagnetic means, said other mercury switch adapted to short-circuit said resistor when said primary windings are connected to the respective phase lines.

ALBERT HUET.